United States Patent [19]

Sollner et al.

[11] 4,408,032

[45] Oct. 4, 1983

[54] MODIFIED POLYAMIDE-IMIDE RESINS AND METHOD FOR MAKING THE SAME

[75] Inventors: George H. Sollner, New Haven; Donny R. Disque; Allan R. Knerr, both of Fort Wayne, all of Ind.

[73] Assignee: Phelps Dodge Industries, Inc., New York, N.Y.

[21] Appl. No.: 289,777

[22] Filed: Aug. 3, 1981

[51] Int. Cl.³ .............................................. C08G 18/34
[52] U.S. Cl. .................................... 528/48; 427/388.2; 428/383; 528/53; 528/67; 528/73
[58] Field of Search ....................... 528/48, 53, 73, 67; 427/388.2; 428/383

[56] References Cited

U.S. PATENT DOCUMENTS

| 3,022,200 | 2/1962 | Koerner et al. | 428/383 |
| 3,790,530 | 2/1974 | Koerner et al. | 528/67 |
| 3,884,880 | 5/1975 | Disque et al. | 528/67 |
| 3,937,673 | 2/1976 | Koerner et al. | 528/67 |

Primary Examiner—Maurice J. Welsh
Attorney, Agent, or Firm—David A. Lundy

[57] ABSTRACT

A modified polyamide-imide resin and method for making the same. The composition comprises the reaction product of an aromatic tricarboxylic acid anhydride reactant, an aromatic diisocyanate reactant and an aliphatic dicarboxylic acid reactant in a solution comprising an aprotic solvent at a temperature ranging from about 70° C. to about 155° C. The tricarboxylic acid anhydride reactant is present in an amount which is greater than about 25 mol percent of the total of the tricarboxylic acid anhydride-aliphatic dicarboxylic acid reactants.

The method comprises the steps of dissolving the aromatic tricarboxylic acid anhydride and aliphatic dicarboxylic acid reactants and an excess of the aromatic diisocyanate reactants in aprotic solvent thereby forming a reaction solution. The aromatic tricarboxylic acid anhydride is present in an amount which is greater than about 25 mol percent of the total of the tricarboxylic acid anhydride-aliphatic dicarboxylic acid reactants. And, reacting the tricarboxylic acid anhydride, dicarboxylic acid and diisocyanate.

28 Claims, 2 Drawing Figures

MODIFIED POLYAMIDE-IMIDE RESINS AND METHOD FOR MAKING THE SAME

BACKGROUND OF THE INVENTION

The invention relates to polyamide-imide resins, and methods for making the same. More particularly, this invention relates to a method of making a modified polyamide-imide resin which can be applied as a coating material from solutions thereof.

Polyamide-imide resins now enjoy an ever growing usefulness in the electrical industry as insulation coatings, such as magnet wire insulation. These resins have been utilized as both base coats and top coats for conductors such as magnet wire. It is well known that an insulated conductor may be upgraded by superimposing an overcoat of a high molecular weight, linear, strong and thermally stable resin thereon. Such an overcoated, insulated magnet wire is disclosed in U.S. Pat. No. 3,022,200. This patent discloses and claims a magnet wire having a base coat of nonlinear, cross-linked and thermoset polyester insulation and an overcoat of a high molecular weight, linear, strong and thermally stable polyamide-imide resin. The term "polyester resin" as used herein refers to any resin having a plurality of ester groups therein, and includes polyester imide, polyamide ester and polyester-amide-imide resins. Such an overcoated magnet wire has better heat shock, solvent shock and winding properties than the insulated magnet wire without the overcoat.

Although present polyamide-imide and modified polyamide-imide coating materials have provided adequate physical properties when applied to conductors, magnet wires that exhibit improved physical properties at lower cost are highly desirable. Exemplary of these physical properties are the coefficient of friction, moisture resistance, abrasion resistance, thermal stability, flexibility and durability of the coating. Because specific applications of coated conductors such as magnet wire may require coefficients of friction falling within a certain range, the ability to selectively determine the coefficient of friction would be highly desirable. Also, because of specific applications of coated conductors such as magnet wire, high abrasion resistance high moisture resistance and thermal stability such as exemplified by the aromatic polyamide-imide coated magnet wires and a low coefficient of friction as exemplified by Nylon polyamide coated magnet wires at the same time would be highly desirable. Such a material has never before been available as a magnet wire enamel.

In manufacturing polyamide-imide coating materials, a wholly aromatic polyamide-imide is made by a one-step process such as that shown in U.S. Pat. No. 3,790,530. A two-step process may also be utilized such as is shown in U.S. Pat. Nos. 3,884,880 and 3,937,673.

Heretofore in the manufacture of polyamide-imide coating materials the proportion of the aliphatic material (ingredient) has been maintained at amounts of less than 50 mol percent. While this manufacturing limitation has not been impossible to meet, it would be highly desirable to provide an improved polyamide-imide coating and method for making the same that utilizes, respectively, amounts of aliphatic material greater than 50 mol percent such would reduce the cost of the coating material. It would also be highly desirable to provide an improved polyamide-imide coating and method for making the same utilizing amounts of aliphatic material in excess of 50 mol percent that exhibit good properties when compared to prior art polyamide-imide magnet wire enamels.

Heretofore in the manufacture of polyamide-imide coating materials the proportion of the acid reactants and the diisocyanate reactants has been critical. In some processes by which polyamide-imide coating materials are manufactured, an excess of diisocyanate cannot be tolerated inasmuch as the excess diisocyanate undergoes a cross-linking reaction whereupon the polyamide-imide coating material looses flexibility. While the careful measuring of reactants has been achieved in the past to produce highly flexible polyamide-imide reaction products, it would be highly desirable to provide an improved polyamide-imide coating material and method for making the same that can tolerate an excess of diisocyanate reactant without any significant loss in properties.

The term "modified polyamide-imide resin" as used herein refers to that group of resins which contain a plurality of amide groups and a plurality of imide groups therein together with a plurality of groups which are not "building blocks" of a "homopolymer." The modified polyamide-imide resins thus should be contrasted with the "unmodified polyamide-imide resins" which include a plurality of amide groups and imide groups therein and can be referred to as a "homopolymer."

It is well known that the reaction between an acid or an acid anhydride and an isocyanate is a vigorous reaction which is difficult to control. Processes that have been developed heretofore have been difficult to control in commercial sized equipment where agitation, temperature and viscosity control and other control techniques, possible in laboratory glass were not readily applicable. The invention provides a method of making modified polyamide-imide resins in commercial size equipment without the control problems experienced heretofore in prior art processes. The synthesis of aromatic polyamide-imide resins are well known to take place in reaction solutions, the solvents of which consist of solvents such as N-methyl pyrrolidone, dimethylacetamide, dimethylformamide, dimethylsulfoxide and the like. Such solvents are those referred to herein as aprotic solvents. The resulting aromatic polyamide-imide resins are characterized by their good thermal stability, toughness, good flexibility and high molecular weight. By this invention, modified polyamide-imide resins are provided having these same properties together with an improved moisture resistance and slipperyness, exhibited by a low coefficient of friction. See for example FIGS. 1 and 2. By the method of the invention, the reaction can be carried out in commercial sized equipment without the control problems heretofore experienced in prior art processes.

SUMMARY OF THE INVENTION

It is therefore a primary object of the invention to provide an improved modified polyamide-imide resin and method for making the same.

It is also a primary object of the invention to provide an improved modified polyamide-imide resin and method of making the same at a lower cost than heretofore possible.

Another object of the invention is to provide an improved polyamide-imide resin having reduced coefficients of friction when applied as a top coat material to a coated conductor.

Another object of the invention is to provide an improved modified polyamide-imide resin and method for making the same wherein the coefficient of friction of the coating material solution when applied as a top coat material to a coated conductor can be selectively determined within certain ranges.

Another object of the invention is to provide an improved polyamide-imide resin and method for making the same which when applied to a coated conductor provides for improved moisture resistance characteristics.

Another object of the invention is to provide an improved polyamide-imide resin and method for making the same which when applied to a coated conductor provides for improved flexibility and durability.

A further object of the invention is to provide an improved method of making a modified polyamide-imide resin and solutions thereof which can tolerate slight excesses of the diisocyanate reactant while still resulting in coatings having high flexibility.

It is an object of the invention to provide an improved polyamide-imide resin and an method of making an improved modified polyamide-imide resin having all of the physical and thermal properties normally associated with prior polyamide-imide resin and solutions thereof that can utilize amounts of aliphatic material over 50 mol percent total acid.

Finally, it is an object of the invention to provide an improved polyamide-imide resin and an method for making an improved modified polyamide-imide resin having all of the physical and thermal properties normally associated with prior polyamide-imide resin that can tolerate excess amounts of the diisocyanate reactant.

In the broader aspects of this invention, there is provided a modified polyamide-imide resin comprising the reaction product of an aromatic diisocyanate reactant, an aromatic tricarboxylic acid anhydride reactant and an aliphatic dicarboxylic acid reactant reacted in a solution comprising an aprotic solvent at a temperature ranging from about 70° C. to about 155° C. The tricarboxylic acid anhydride reactant is greater than about 25 mol percent of the combined tricarboxylic acid anhydride reactant and aliphatic dicarboxylic acid reactant.

The method of the invention comprises the steps of dissolving aromatic tricarboxylic acid anhydride and aliphatic dicarboxylic acid reactants and an excess of aromatic diisocyanate in an aprotic solvent to form a reaction solution. The aromatic tricarboxylic acid anhydride is present in an amount greater than about 25 mol percent of the total or combined tricarboxylic acid anhydride and aliphatic dicarboxylic acid reactants. And, reacting the tricarboxylic acid anhydride, dicarboxylic acid, and diisocyanate.

BRIEF DESCRIPTION OF THE DRAWINGS

The above-mentioned and other features and object of this invention and the manner of attaining them will become more apparent and the invention itself will be best understood by reference to the following description of an embodiment of the invention taken in conjunction with the accompanying drawing, wherein.

DESCRIPTION OF SPECIFIC EMBODIMENTS

In accordance with the present invention, polyamide-imide resins are formed by reacting essentially stoichiometric amounts of an aromatic diisocyanate and an aromatic tricarboxylic acid anhydride and an aliphatic dicarboxylic acid. From about 30 mole percent to about seventy-five mole percent of the combined or total aromatic tricarboxylic acid anhydride-aliphatic dicarboxylic acid reactant may comprise an aliphatic dicarboxylic acid, the remainder being an aromatic tricarboxylic acid anhydride.

The method of the invention provide a process for manufacturing such polyamide-imide resins in conventional commercial-sized equipment. The method of the invention produces solutions of said polyamide-imide resins from which the resins of the invention can be applied to conductors enamels by conventional wire coating machinery.

It is commonly known that polyamide-imide resins can be synthesized by reacting aromatic tricarboxylic acid anhydride with an aromatic diisocyanate, as illustrated in the following equation using, for example, trimelitic anhydride and methylene diisocyanate as reactants:

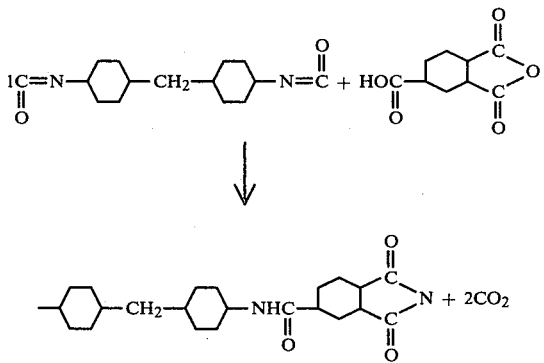

Heretofore, it was thought that if the amount of aliphatic dicarboxylic acid was greater than fifty mole percent of the aromatic tricarboxylic acid anhydride-aliphatic dicarboxylic acid reactant, the properties of the polyamide-imide resin would be unacceptable. However, suprisingly the invention provides a method of making polyamide-imide resins in commercial size equipment having acceptable properties.

Figure 1:
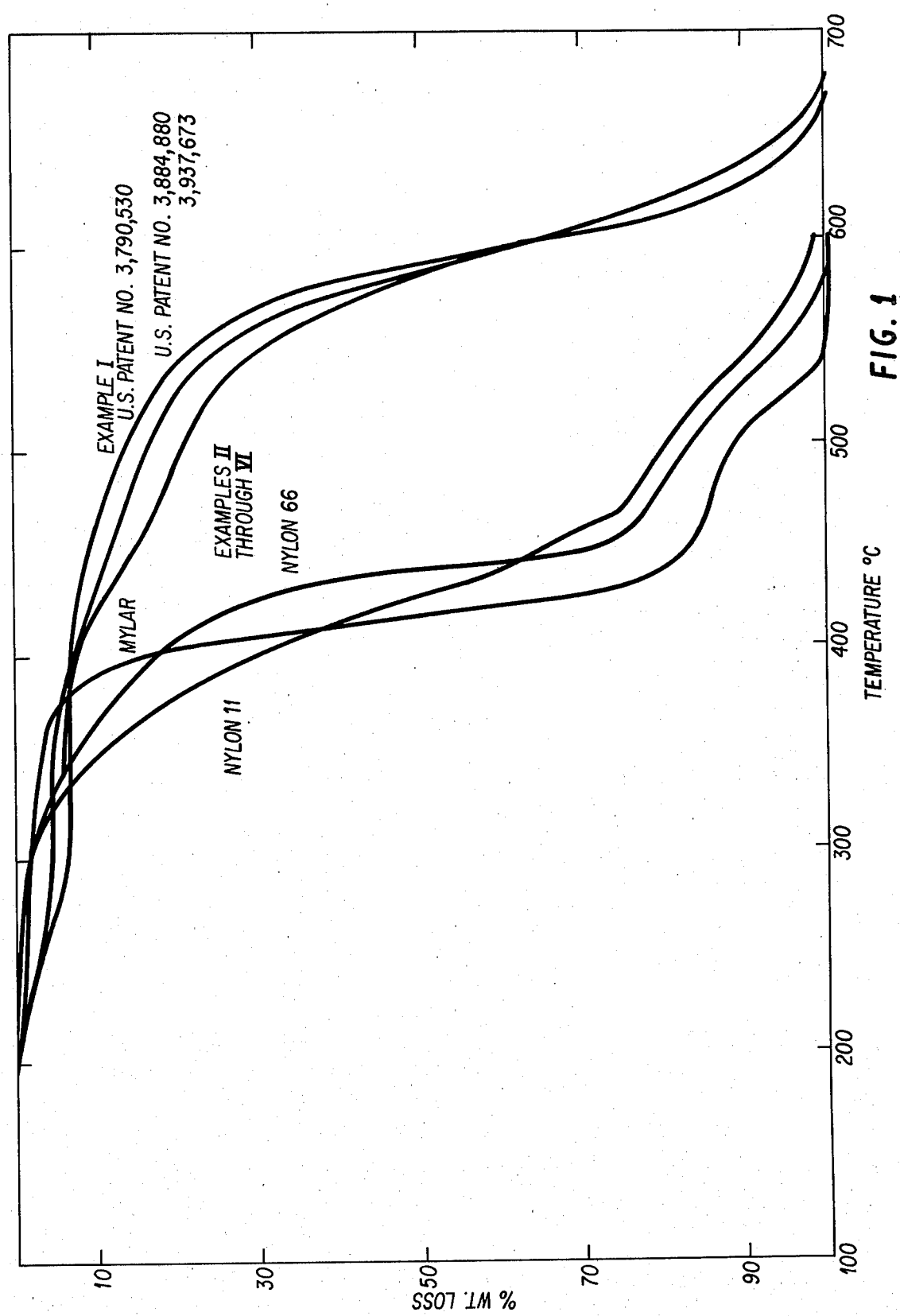
FIG. 1 is a graphical representation of a comparison of the thermal stability of a modified polyamide-imide resin of the invention with a prior art non-modified aromatic polyamide-imide resin as disclosed in U.S. Pat. No. 3,790,530, a prior art modified aromatic polyamide-imide resin as disclosed in U.S. Pat. No. 3,884,880 and 3,937,673, a prior art "MYLAR" polyethylene terephthalate, and two prior art polyamide materials manufactured by the Rilsan Corporation of Glen Rock, N.J. and the E. I. Dupont deNemours and Company, Inc. of Wilmington, Del. under the trademarks "NYLON 11," "NYLON 6,6," respectively, wherein the Y-axis represents percent weight loss and the X-axis represents temperature as measured in °C.

Inclusive of these properties is the thermal stability of the material. Even though the aliphatic dicarboxylic acid is greater than 50 mol percent of the combined or total aromatic tricarboxylic acid anhydride-aliphatic dicarboxylic acid reactant; the thermal stability approaches that of un-modified aromatic polyamide-imide resins and prior art modified aromatic polyamide-imide resins, and is far superior to those polyethylene terephthalate and polyamide materials sold under trademarks "MYLAR," and "NYLON 66." This is graphically represented by FIG. 1.

Further, by the present invention, it is found that reactions between aromatic diisocyanates and amounts of aromatic tricarboxylic acid anhydrides and dicarboxylic acids wherein the aliphatic dicarboxylic acid comprises between about 30 mol percent to about seventy-five mol percent of the combined or total aromatic tricarboxylic and anhydride aliphatic dicarboxylic acid reactant result in a resin which then applied to conductors have greater moisture resistance than prior art Nylon polyamide resins and when applied as a top coat to conductors have greater slipperyness as exemplified by lower coefficient of friction than heretofore possible while generally maintaining the properties of prior art amide imide resins. In fact, the modified polyamide-imide resins of the invention having about 30% mole trimellitic anhydride therein have a coefficient of friction approaching that of Nylon polyamide resins which is well known to be about 0.18.

The aliphatic dicarboxylic acids which are useful in the invention include all such acids having at least six carbon atoms, specifically adipic, pimelic, suberic, azelaic, dimerized unsaturated fatty acids and sebacic acids. The term "dimerized unsaturated fatty acids" includes dimerized acids and diacids obtained through polymerization at mid-molecule positions of two unsaturated monobasic acids having about eighteen carbons, such as oleic, elaidic acids.

Suitable diisocyanates which are useful in the invention include diisocyanates having a nucleus such as benzene, naphthalene, diphenylalkane having one to three carbon atoms between rings, diphenylether, diphenylketone, cycloalkane with five to seven carbon atoms in the ring and specifically include:
1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4'diisocyanate-diphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4 isopropyl-1,3, phenylene diisocyanate
durylene diisocyanate
3,3'-bitolylene-4,4diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylylene diisocyanate
4,4'-diisocyanate-diphenyl
meta-phenylenediisocyanate
and combinations thereof.

The tricarboxylic acid anhydrides which have usefulness in the invention include trimellitic anhydrides; hemimellitic anhydride; methyltrimellitic anhydride; 4' carboxy diphenyl 3,4 dicarboxylic anhydride; 1,2,4 benzene tricarboxylic anhydride; 3,4,6 and 1,3 8 naphthalene tricarboxylic anhydride; 1,2,7 anthracene tricarboxylic anhydride, and combinations thereof.

It is also possible to combine the aliphatic dicarboxylic acid and an excess of aromatic diisocyanate in a reaction solution of aprotic solvent. This solution is heated to about 95° C. whereupon through exothermic reaction the solution reaches a temperature of about 125° C. The solution is then cooled to 95° C. and maintained thereat for about forty-five minutes. The aromatic tricarboxylic acid anhydride and more aprotic solvent is then added thereby reducing the temperature of the solution to about 75° C. More aromatic diisocyanate is added. The solution is then step heated, first at about 115° C. for about one hour, and then at about 155° C. for about one hour. The solution is then cooled to room temperature.

The manufacture of polyamide-imide resins in accordance with the invention also provides for a method whereby the coefficient friction of the conductor to which said resin is applied as a top coat can be selectively determined within a certain range.

It has been found that the coefficient of friction of the composition of matter of the invention when applied to the top coat to a conductor having a thermosetting polyester as a base coat generally varies according to the following equation:

$$C = 0.288 - [(1.167 \times 10^{-3})(100 - X)]$$

wherein the C equals co-efficient of friction, and X equals the mole percent of the tricarboxylic acid anhydride. See FIG. 2.

The following examples illustrate the present invention.

EXAMPLE I

A solution is formed by dissolving 145.2 grams of trimellitic acid anhydride and 189.6 grams of p, p' diphenyl methane diisocyanate in 631.8 grams of N-methyl pyrrolidone and 270.8 grams of an aromatic solvent by stirring the same at about 75° C. at atmospheric pressure for about 5 hours. Both the aromatic solvent and the N-methyl pyrrolidone contain less than about 0.12% weight water. The solution is the heated to about 170° C. and maintained thereat for about 2 hours. A condensor is used to prevent loss. The resultant solution is cooled to room temperature and filtered, if necessary. The viscosity of the resin is reduced with a 70/30 blend by weight of N-methyl pyrrolidone (70% weight) and an aromatic solvent (30% weight) to give a viscosity of 2400 cps at 100° F. as measured by a Brookfield Viscometer. The resulting resin solution contained 21.8% weight resin solids.

Figure 2:
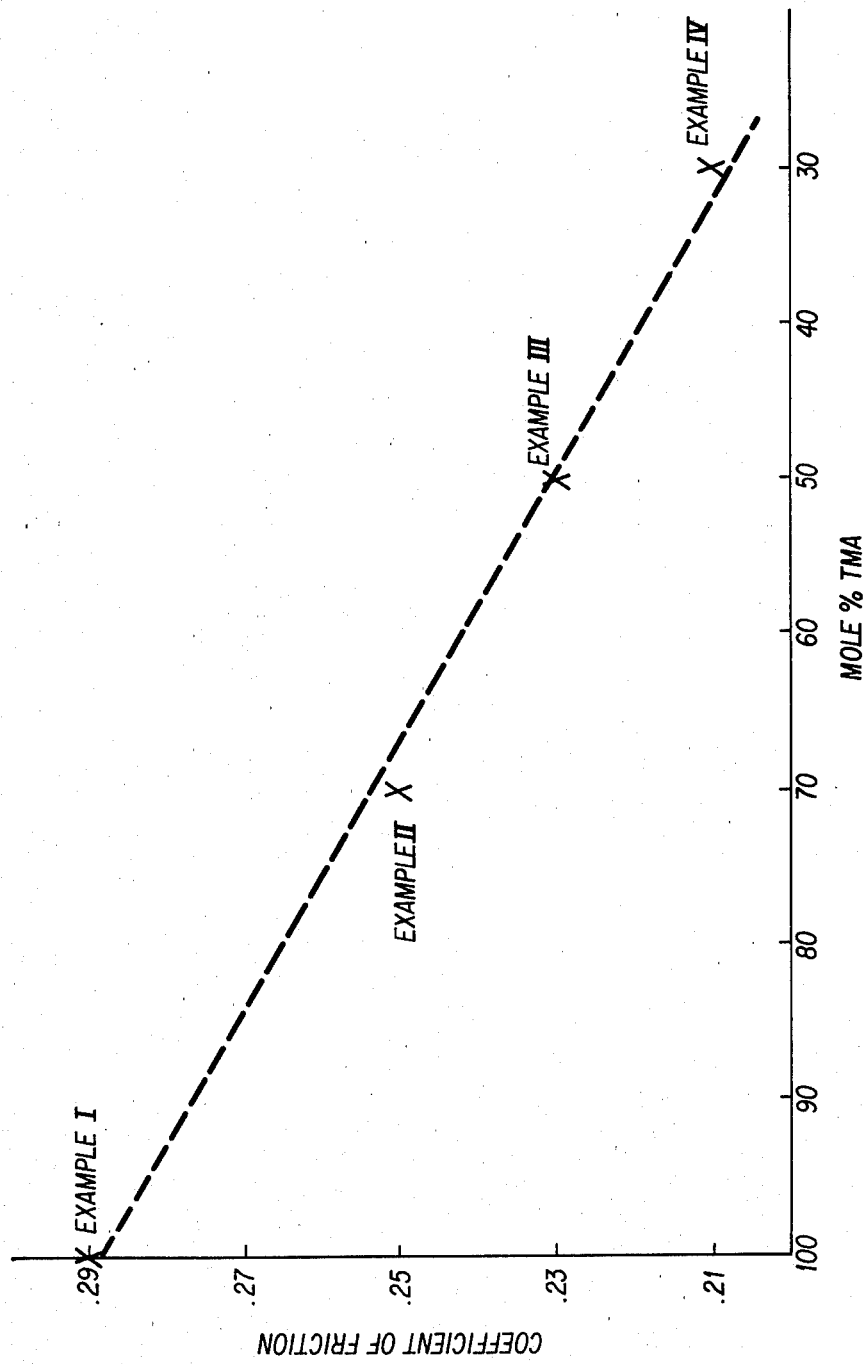
FIG. 2 is a graphical representation of the coefficient of friction of the modified polyamide-imide resin of the invention wherein the X-axis represents the coefficient of friction of magnet wire having the modified polyamide imide resin of the invention as the top coat above-described and the X-axis represents the mol percent of the aromatic tricarboxylic acid anhydride reactant.

The resultant solution was then applied in six consecutive coats to a bare copper conductor having no insulation thereon and in two consecutive coats to an insulated copper conductor having a base coat consisting of four consecutive coats of a thermosetting polyester (Isonel 200 Polyester enamel, as sold by Schnectady Chemicals Corporation) employing dies and a conventional wire coating tower at 50 feet per minute having bank temperatures of 850° F., 800° F. and 625° F. The properties of the resultant magnet wire previously are in Table I. The coefficient of friction is also shown in FIG. 2.

EXAMPLE II

A solution is formed by dissolving 11 pounds of adipic acid, 33.6 pounds of trimellitic acid anhydride, and 62.5 pounds of P-P'-diphenyl methane diisocyanate in 140 pounds of N-methyl pyrrolidone and 60 pounds of an aromatic solvent. Both the aromatic solvent and the N-methyl pyrrolidone contain less than about 0.12% weight water. The resultant solution is heated to about 70° C., with stirring, is maintained thereat for about four hours at atmospheric pressure. The temperature of the solution is then raised to about 155° C. and maintained thereat until the resin solution reaches a viscosity of about 400 cps as measured at 155° C. by a Brookfield viscometer. A condenser is used to prevent loss. The viscous material is cooled to room temperature, filtered if necessary, and the viscosity is reduced to 1900 cps as measured at 100° F. by a Brookfield viscometer with a 70/30 mixture by weight of N-methyl pyrrolidone (70% weight) and aromatic solvent (30% weight). The resultant solution contains 25.3 weight percent resin solids.

The resultant solution was then applied in six consecutive coats to a bore copper conductor having no insulation thereon and in two consecutive coats to an insulated copper conductor having a base coat consisting of four consecutive coats of a thermosetting polyester (Isonel 200 Polyester enamel), as sold by Schnectady Chemicals Corportion) employing dies and a conventional wire coating tower at 50 feet per minute having bank temperatures of 850° F., 800° F. and 625° F. The properties of the resultant magnet wire and the properties of a similar magnet wire coated with a commercially available polyamide-imide resin are compared in Table I. The coefficient of friction is also shown in FIG. 2.

EXAMPLE III

A solution is formed by dissolving 23.9 pounds of trimellitic acid anhydride, 7.6 pounds of adipic acid and 45.5 pounds of p,p'-diphenyl methane diisocyanate in 16.9 gallons of N-methyl pyrrolidone. The N-methyl pyrrolidone contains less than about 0.12% weight water. The mass was then heated to about 80° C. at atmospheric pressure and maintained for about four hours at a temperature of between about 70° C. and about 100° C. This solution was then cooled to about 80° C. by the addition of 29.6 pounds of N-methyl pyrrolidone. At a temperature of about 80° C., 10.6 pounds of adipic acid and 18.0 pounds of p,p'-diphenyl methane diisocyanate was added. The solution was then heated to about 150° C. and maintained thereat for about one hour at atmospheric pressure. The reaction was then stopped by adding 74.3 pounds of an aromatic solvent. The resultant polymer solution had a viscosity of about 1700 cps as measured at 100° F. by a Brookfield viscometer, and contained 29.5 percent weight determined resin solids.

The resultant solution was then applied in six consecutive coats to a bare copper conductor having no insulation thereon and in two consecutive coats to an insulated copper conductor having a base coat consisting of four consecutive coats of a thermosetting polyester (Isonel 200 Polyester enamel, as sold by Schnectady Chemicals Corporation) employing dies and a conventional wire coating tower at 50 feet per minute having bank temperatures of 850° F., 800° F. and 625° F. The properties of the resultant magnet wire and the properties of a similar magnet wire coated with a commercially available polyamide-imide resin are compared in Table I. The coefficient of friction is also known in FIG. 2.

EXAMPLE IV

A solution is formed by dissolving 102.3 grams of adipic acid, 168 grams of p,p'-diphenyl methane diisocyanate in 500 grams of anhydrous N-methyl pyrrolidone. The resulting mass was heated to about 95° C. at atmospheric pressure, where an exothermic reaction occurred to raise the temperature thereof to about 125° C. The clear solution was slowly cooled to about 95° C. and maintained thereat for about forty-five minutes. After the allotted time interval, 192.5 grams of N-methyl pyrrolidone and 57.6 grams of trimellitic acid anhydride were added to reduce the temperature of the solution to about 75° C. When the solution temperature reached 75° C., 87.0 grams of p,p'-diphenyl methane diisocyanate was added. The temperature was then raised to about 115° C. and maintained thereat at one hour at atmospheric pressure, after which the temperature was raised to about 155° C. and maintained thereat for about one hour. All N-methyl pyrrolidone added contains less than 0.12% weight water. The reaction was then terminated with the addition of 98.9 grams of N-methyl pyrrolidone and 197.9 grams of an aromatic solvent. The resultant solution has a viscosity of about 2260 cps as measured at 100° F. by a Brookfield viscometer, and contained 24.8 percent weight theoretical solids.

The resultant solution was then applied in two consecutive coats to an insulated copper conductor having a base coat consisting of four consecutive coats of a thermosetting polyester (Isonel 200 Polyester enamel, as sold by Schnectady Chemicals Corporation) employing dies and a conventional wire coating tower at 50 feet per minute having bank temperatures of 850° F., 800° F. and 625° F. The properties of the resultant magnet wire and the properties of a similar magnet wire coated with a commercially available polyamide-imide resin are compared in Table I. The coefficient of friction is also shown in FIG. 2.

EXAMPLE V

A solution is formed by dissolving 11.0 grams of adipic acid, 18.08 grams of p,p'-diphenyl methane diisocyanate in 54 grams of anhydrous N-methyl pyrrolidone. The resulting mass was heated to about 95° C. at atmospheric pressure, where an exothermic reaction occurred to raise the temperature thereof to about 125° C. The clear solution was slowly cooled to about 95° C. and maintained thereat for about forty-five minutes. After the allotted time interval, 124.5 grams of N-methyl pyrrolidone and 33.6 grams of trimellitic acid anhydride were added to reduce the temperature of the solution of about 75° C. When the solution temperature reached 75° C., 44.42 grams of p,p'-diphenyl methane diisocyanate was added. The temperature was then raised to about 115° C. and maintained thereat at one hour at atmospheric pressure, after which the temperature was raised to about 155° C. and maintained thereat for about one hour. All N-methyl pyrrolidone added contains less than 0.12% weight water. The reaction was then terminated with the addition of 76.5 grams of an aromatic solvent. The resultant solution has a viscosity of about 2000 cps as measured at 100° F. by a Brookfield viscometer, and contained 24.8 percent weight theoretical solids.

EXAMPLE VI

A solution is formed by dissolving 5.12 grams of adipic acid, 8.42 grams of p,p'-diphenyl methane diisocyanate in 33.89 grams of anhydrous N-methyl pyrrolidone. The resulting mass was heated to about 95° C. at atmospheric pressure, where an exothermic reaction occurred to raise the temperature thereof to about 125° C. The clear solution was slowly cooled to about 95° C. and maintained thereat for about forty-five minutes. After the allotted time interval, 13.56 grams of N-methyl pyrrolidone and 6.74 grams of trimellitic acid anhydride were added to reduce the temperature of the solution to about 75° C. When the solution temperature reached 75° C., 9.47 grams of p,p'-diphenyl methane diisocyanate was added. The temperature was then raised to about 115° C. and maintained thereat at one hour at atmospheric pressure, after which the temperature was raised to about 155° C. and maintained thereat for about one hour. All N-methyl pyrrolidone added contains less than 0.12% weight water. The reaction was then terminated with the addition of 1.725 grams of N-methyl pyrrolidone and 21.075 grams of an aromatic solvent. The resultant solution has a viscosity of about 2920 cps as measured at 100° F. by a Brookfield viscometer, and contained 27.1 percent weight theoretical solids.

OTHER EXAMPLES

In each of the above examples a particular aromatic tricarboxylic acid anhydride and a particular aromatic diisocyanate and a particular aliphatic dicarboxylic acid are reacted in particular solvents and particular solvents are used to stop the reaction. It is to be understood that in each of the Examples, any one of and any combination of two or more of any of the aromatic tricarboxylic acid anhydrides indicated hereinabove to be useful in the performance of the invention can be substituted, in the same mol amount, for the aromatic tricarboxylic acid anhydride of the example. Similarly, any one of and any combination of two or more of any of the aromatic diisocyanates and the aliphatic dicarboxylic acids and the aprotic solvents indicated hereinabove to be useful in the invention can be substituted, in the same mol amount for the aromatic diisocyanates and the aliphatic dicarboxylic acids, and in the same amount by weight for aprotic solvents, for the aromatic diisocyanates, aliphatic dicarboxylic acids, the aprotic solvents respectively, used in the Examples. The properties of these solutions applied to conductors as described in the Examples have properties comparable to those shown in Table I, respectively.

It should be understood that with regard to all of the above examples, the heating of the reaction solution prior to quenching and stopping the reaction, is carried out as a reasonable rate, for example about 2° C. per minute. While it is believed that the rate at which the reaction solution is raised in temperature is not critical, extremely slow rates which would materially alter the time/temperature reaction conditions of the invention are undesirable. Similarly, the rate at which the dicarboxylic acid is added to the reaction solution is at a relatively slow rate, for example in five equal portions. Again, while the rate of addition of the acid reactant is not believed to be critical, extreme deviations from this rate are undesirable.

The present invention provides an improved polyamide-imide resin, an improved method of producing a polyamide-imide resin, and an improved polyamide-imide resin solution meeting all of the above-listed objects of the invention. The polyamide-imide resins of the invention are preferred over prior art polyamide-imide resins for a number of reasons. The polyamide-imide resins of the invention exhibit improved moisture resistance, flexibility and durability characteristics when applied as top coat material to a coated conductor. When applied as a top coat material to a coated conductor these resins also exhibit an improved coefficient of friction. The coefficient of friction approaches that of Nylon polyamide materials. These resins also exhibit acceptable thermal stability characteristics heretofore known only with materials having higher coefficients of friction as well as being made with aliphatic dicarboxylic acid reactant being present in less than 30 mol percent as described above.

The process of the invention allows the modified polyamide-imide resins of the invention to be manufactured relatively easily in commercial sized equipment. These resins can be applied as top coats using conventional magnet wire coating machinery and conventional solvents. The process also provides for the manufacture of the modified polyamide-imide resin of invention wherein the coefficient of friction of the solution when applied as a top coat material to a coated conductor can be selectively determined within certain ranges.

While there have been described above the principles of this invention in connection with specific reactants, reaction conditions and the like, it is to be clearly understood that the description is made only by way of example and not as a limitation of the scope of the invention.

TABLE I

| | | | Properties of Coated Conductors (AWG 18 Copper Wire) Having A Topcoat Made According To Examples I, II, III IV, V AND VI | | | | | | |
|---|---|---|---|---|---|---|---|---|---|
| Enamel Basecoat | Isonel 200 | Isonel 200 | Isonel 200 | Isonel 200 | Isonel 200 | Isonel 200 | Example I | Example II | Example III |
| Enamel Topcoat | Example I | Example II | Example III | Example IV | Example V | Example VI | None | None | None |
| Surface Rating | 1.1 | 1.1 | 1.1 | | | 1.1 | 1.3 | 1.1 | 1.3 |
| Build (mils) | 2.9-3.4 | 2.8-3.0 | 3.0-3.0 | 2.8-3.2 | 2.8-3.0 | 3.0-3.0 | 3.1-3.4 | 3.0-3.3 | 3.4-3.5 |
| Elongation (%) | 34 | 33 | 33 | 33 | 33 | 33 | 36 | 32 | 36 |
| Mandrel Flex | OK BP 1 × | OK BP 1 × | OK BP 1 × | OK BP 1 × | OK BP 1 × | OK BP 1 × | Pass 35% | BP 1 × OK | BP 1 × OK |

TABLE I-continued

Properties of Coated Conductors (AWG 18 Copper Wire)
Having A Topcoat Made According To Examples I, II, III IV, V AND VI

| Enamel Basecoat | Isonel 200 | Isonel 200 | Isonel 200 | Isonel 200 | Isonel 200 | Isonel 200 | Example I | Example II | Example III |
|---|---|---|---|---|---|---|---|---|---|
| Enamel Topcoat | Example I | Example II | Example III | Example IV | Example V | Example VI | None | None | None |
| Snap | OK | OK | OK | OK | OK | OK | Pass | OK | OK |
| Snap Flex | OK 1 × | OK 1 × | OK 1 × | OK 1 × | OK 1 × | OK 1 × | 2 × OK | 1 × OK | 1 × OK |
| Heat Shock | | | | | | | | | |
| 20% 3 × 220° C. | Pass | Pass | Pass | Pass | Pass | Pass | | | |
| 20% 3 × 260° C. | Pass | Pass | Pass | Pass | Pass | Pass | | | |
| NEMA Cut-Thru (°C.) | 372 | 370 | 346 | 336 | 370 | 362 | 379 | 362 | 325 |
| Techrand OFM | 10.5 | 12.4 | 11.1 | 11.1 | 12.4 | 11.1 | 12.56 | 9.50 | 8.50 |
| Repeated Scrape | 90 | 50 | 31 | 32 | 50 | 31 | 181 (700 gms) | 178 (700 gms) | 149 (700 gms) |
| Unidirectional Scrape | 1,660 | 1,578 | 1,475 | 1,443 | 1.578 | 1,475 | 1580 | 1690 | 1939 |
| Coefficient of Friction | .29 | .25 | .23 | .21 | .25 | .23 | .29 | | |

What is claimed is:

1. An improved polyamide-imide composition of matter comprising the reaction product of aromatic tricarboxylic acid anhydride reactant, aromatic diisocyanate reactant and aliphatic dicarboxylic acid reactant reacted in a solution comprising aprotic solvent at a temperature ranging from about 70° C. to about 160° C. at atmospheric pressure, said tricarboxylic acid anhydride reactant being present in an amount which is greater than about twenty-five mol percent of the total tricarboxylic acid anhydride and aliphatic dicarboxylic acid reactant.

2. The composition of claim 1 wherein said anhydride reactant is of the group consisting of trimellitic anhydride; hemimellitic anhydride; methyltrimellitic anhydride; 4' carboxy diphenyl 3,4 dicarboxylic anhydride; 1,2,4 benzene tricarboxylic anhydride; 3,4,6 and 1,3,8 naphthalene tricarboxylic anhydride; 1,2,7 anthracene tricarboxylic anhydride; and combinations thereof.

3. The composition of claim 1 wherein said diisocyanate reactant is of the group consisting of:
1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyante
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanate-diphenylether
1,3-phenylenediisocyanate
3,3'-dimethoxy-4,4'-biphenylenediisocyanate
3,3'-diethoxy-4,4'-biphenylenediisocyanate
2,4-tolylenediisocynate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4 isopropyl-1,3, phenylene diisocyanate
durylene diisocyanate
3,3'-bitolylene-4,4 diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylylene diisocyanate
4,4'-diisocyanate-diphenyl
meta-phenylenediisocyanate
and combinations thereof.

4. The composition of claim 1 wherein said acid reactant is of the group consisting of adipic, pimelic, suberic, azeliac, dimerized unsaturated fatty acids, sebacic acids and combinations thereof.

5. The composition of claim 1 wherein said solvent is of the group consisting of N-methyl pyrrolidone, dimethyl acetamide, dimethyl formamide, dimethyl sulfoxide, and combinations thereof.

6. The composition of claim 1 wherein said diisocyanate reactant is present in said reaction solution in excess.

7. The composition of claim 1 which when applied as a top coat by conventional wire coating equipment in two passes on a bare AWG 18 gauge copper wire having a base coat of a thermosetting polyester has a co-efficient friction of less than about 0.29.

8. The composition of claim 7 wherein said base coat comprises four consecutive coats of a thermosetting polymer.

9. A magnet wire comprising a wire conductor having a base coat of a thermosetting polyester, and a top coat of a modified polyamide-imide, said magnet wire having a co-efficient of friction of less than about 0.29, said top coat being the reaction product of aromatic tricarboxylic acid anhydride reactant, aromatic diisocyanate reactant and aliphatic dicarboxylic acid reactant in a solution comprising aprotic solvent at a temperature ranging from about 70° C. to about 160° C. at atmospheric pressure, said tricarboxylic acid anhydride reactant being present in an amount greater than about 25 mol percent of the total tricarboxylic acid anhydride reactant and aliphatic dicarboxylic acid reactant.

10. The magnet wire of claim 9 wherein said anhydride reactant is of the group consisting of trimellitic anhydride; hemimellitic anhydride; methyltrimellitic anhydride; 4' carboxy diphenyl 3,4 dicarboxylic anhydride; 1,2,4 benzene tricarboxylic anhydride; 3,4,6 and 1,3,8 naphthalene tricarboxylic anhydride; 1,2,7 anthracene tricarboxylic anhydride; and combinations thereof.

11. The magnet wire of claim 9 wherein said diisocyanate reactant is of the group consisting of:
1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanate-diphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4 isopropyl-1,3, phenylene diisocyanate
durylene diisocyanate
3,3'-bitolylene-4,4 diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylylene diisocyanate
4,4'-diisocyanate-diphenyl
meta-phenylenediisocyanate
and combinations thereof.

12. The magnet wire of claim 9 wherein said acid reactant is of the group consisting of adipic, pimelic, suberic, azeliac, dimerized unsaturated fatty acids, sebacic acids and combinations thereof.

13. The magnetic wire of claim 9 wherein said solvent is of the group consisting of N-methyl pyrrolidone, dimethyl acetamide, dimethyl formamide, dimethyl sulfoxide, and combinations thereof.

14. A method comprising the steps of:
dissolving aromatic tricarboxylic acid anhydride, aliphatic dicarboxylic acid and an excess of aromatic diisocyanate is aprotic solvent, said aromatic tricarboxylic acid anhydride being present in an amount which is greater than about 25 mol percent of the tricarboxylic acid anhydride and aliphatic dicarboxylic acid anhydride thereby to form a reaction solution; and
reacting said tricarboxylic acid anhydride, dicarboxylic acid and diisocyanate.

15. The method of claim 14 wherein said dissolving step is accomplished at about 70° C. at atmospheric pressure for about four hours.

16. The method of claim 14 wherein said reacting step is accomplished at about 155° C. at atmospheric pressure until the solution reaches a viscosity of about 400 cps at about 155° C.

17. The method of claim 14 wherein said dissolving step comprises:
dissolving said dicarboxylic acid and an excess of said aromatic diisocyanate in said aprotic solvent to form an initial reaction solution; and
dissolving said aromatic tricarboxylic acid anhydride and an excess of said diisocyanate in the reaction product thereof.

18. The method of claim 17 wherein said dicarboxylic acid dissolving step is accomplished at a temperature from about 70° C. to about 100° C.

19. The method of claim 17 wherein said anhydride dissolving step is accomplished at a temperature of about 70° C. to about 100° C.

20. The method of claim 15 wherein said reacting step comprises:
initially reacting said dicarboxylic acid and said diisocyanate; and
secondly reacting said anhydride with said dicarboxylic acid and said diisocyanate.

21. The method of claim 20 wherein said initial reacting step is accomplished at from about 70° C. to about 100° C. for about four hours.

22. The method of claim 20 wherein said second reacting step is accomplished at about 120° C. to about 150° C. for about one hour.

23. The method of claim 14 wherein said dissolving step comprises:
initially dissolving said aliphatic dicarboxylic acid in an excess of said diisocyanate to form an initial reaction solution;
secondly dissolving said aromatic tricarboxylic acid anhydride in said initial reaction solution to form a secondary reaction solution; and
finally dissolving a sufficient amount of said diisocyanate in said secondary reaction solution.

24. An improved polyamide-imide composition of matter utilized as a top coat for a magnet wire having a base coat of thermosetting polyester, the composition comprising:
the reaction product of aromatic tricarboxylic acid anhydride reactant, aromatic diisocyanate reactant, an aliphatic dicarboxylic acid reactant reacted in a solution comprising aprotic solvent at a temperature ranging from about 70° C. to about 160° C., said composition of matter applied as said top coat having a co-efficient of friction according to the following equation where the amount of said tricarboxylic acid anhydride is greater than about twenty-five mol percent of the total tricarboxylic acid anhydride and dicarboxylic acid:

$$C = 0.288 - [(1.167 \times 10^{-3})(100 - X)]$$

wherein C equals the coefficient of friction and X equals the mol percent of said tricarboxylic acid anhydride.

25. The composition of claim 24 or method of claim 14 wherein said anhydride reactant is of the group consisting of trimellitic anhydride; hemimellitic anhydride; methyltrimellitic anhydride; 4' carboxy diphenyl 3,4 dicarboxylic anhydride; 1,2,4 benzene tricarboxylic anhydride; 3,4,6 and 1,3,8 naphthalene tricarboxylic anhydride; 1,2,7 anthracene tricarboxylic anhydride; and combinations thereof.

26. The composition of claim 24 or method of claim 14 wherein said diisocyanate reactant is of the group consisting of:
1,4-phenylenediisocyanate
2,5-tolylenediisocyanate
3,5-tolylenediisocyanate
1-methoxy-2,4-phenylenediisocyanate
1,3,5-triethyl-2,4-phenylenediisocyanate
1-methyl-3,5-diethyl-6-chloro-2,4-phenylenediisocyanate
p-xylylenediisocyanate
benzophenone-4,4'-diisocyanate
1,4-naphthylenediisocyanate
4,4'-diisocyanate-diphenyldimethylmethane
4,4'-diisocyanate-3,3'-dimethyldiphenylmethane
1,5-naphthylenediisocyanate
4,4'-diisocyanate-3,3'-dichlorodiphenylmethane
4,4'-diisocyanate-diphenylether and 2,4-diisocyanate-diphenylether
1,3-phenylenediisocyanate
3,3'-dimethoxy-4,4'-biphenylenediisocyanate
3,3'-diethoxy-4,4'-biphenylenediisocyanate
2,4-tolylenediisocyanate
2,6-tolylenediisocyanate
4-chloro-1,3-phenylenediisocyanate
4,4'-biphenylenediisocyanate
3,3'-dimethyl-4,4'-biphenylenediisocyanate
m-xylylenediisocyanate
1-methyl-3,5-diethyl-2,4-phenylenediisocyanate
diphenyl-4,4-diisocyanate
diphenyl methane-4,4-diisocyanate
4,4-dimethyldiphenyl methane-2,2-diisocyanate
4-methoxy-1,3-phenylene diisocyanate
4 isopropyl-1,3, phenylene diisocyanate
durylene diisocyanate
3,3'-bitolylene-4,4 diisocyanate
1-methyl-3,5-diethyl-2,6-phenylenediisocyanate
4,4'-diisocyanate-2,2-diphenylpropane
4,4'-diisocyanate-diphenylmethane
4,6-dimethyl-1,3-xylene diisocyanate
4,4'-diisocyanate-diphenyl
meta-phenylenediisocyanate
and combinations thereof.

27. The composition of claim 24 or method of claim 14 wherein said acid reactant is of the group consisting of adipic, pimelic, suberic, azelaic, dimerized unsaturated fatty acids, sebacic acids and combinations thereof.

28. The composition of claim 24 or method of claim 14 wherein said solvent is of the group consisting of N-methyl pyrrolidone, dimethyl acetamide, dimethyl formamide, dimethyl sulfoxide, and combinations thereof.

* * * * *